United States Patent
Brewis et al.

(10) Patent No.: US 8,751,612 B2
(45) Date of Patent: Jun. 10, 2014

(54) CREATING CROSS-TECHNOLOGY CONFIGURATION SETTINGS

(75) Inventors: Deon C. Brewis, Redmond, WA (US); Taroon Mandhana, Redmond, WA (US); PehKeong Teh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 12/276,240

(22) Filed: Nov. 21, 2008

(65) Prior Publication Data

US 2010/0131619 A1    May 27, 2010

(51) Int. Cl.
*G06F 15/177* (2006.01)
(52) U.S. Cl.
USPC ........................................ 709/220
(58) Field of Classification Search
USPC ........................................ 709/220
See application file for complete search history.

(56) References Cited

U.S. PATENT DOCUMENTS

| | | | |
|---|---|---|---|
| 5,497,504 A * | 3/1996 | Acampora et al. | 455/436 |
| 6,029,196 A | 2/2000 | Lenz | |
| 6,715,143 B1 | 3/2004 | Chantrain et al. | |
| 6,910,127 B1 | 6/2005 | Player | |
| 7,027,412 B2 | 4/2006 | Miyamoto et al. | |
| 7,168,044 B1 | 1/2007 | Mao | |
| 2002/0029273 A1 * | 3/2002 | Haroldson et al. | 709/226 |
| 2002/0188733 A1 | 12/2002 | Collins et al. | |
| 2003/0026255 A1 * | 2/2003 | Poeluev et al. | 370/392 |
| 2004/0117513 A1 * | 6/2004 | Scott | 710/1 |

(Continued)

FOREIGN PATENT DOCUMENTS

WO    WO 2007-035352 A1    3/2007

OTHER PUBLICATIONS

Creating the Network Printer Configuration File, http://docs.hp.com/en/32650-90867/ch03s03.html, downloaded on Nov. 10, 2008.

(Continued)

*Primary Examiner* — William Goodchild
(74) *Attorney, Agent, or Firm* — Andrew Sanders; Micky Minhas

(57) ABSTRACT

A network and connection provisioning framework for configuring and provisioning multiple aspects of network connectivity (e.g., multiple networks, media types, and/or connections). The framework may comprise a unified configuration interface that enables an administrator to configure multiple different types of network connectivity. A single configuration file comprising settings for multiple aspects of network connectivity may be generated based on preferences entered by a system administrator, or by exporting current settings from a particular computing device. Global configuration policies or other configuration settings that span multiple types of network connectivity may be also created and stored in one or more configuration files. Stand-alone media managers and/or plug-in modules may implement one or more standardized application programming interface functions so that they may interoperate with the network and connection provisioning framework. The standardized API may be used to ensure that configuration information is handled and stored in a standardized manner by different media managers and/or plug-in modules.

19 Claims, 13 Drawing Sheets

(56) References Cited

U.S. PATENT DOCUMENTS

| | | |
|---|---|---|
| 2005/0091357 A1 | 4/2005 | Krantz et al. |
| 2005/0149948 A1 | 7/2005 | Gupta et al. |
| 2005/0198234 A1* | 9/2005 | Leib et al. ............... 709/221 |
| 2005/0260989 A1 | 11/2005 | Pourtier et al. |
| 2006/0003807 A1* | 1/2006 | Inoue et al. ............... 455/561 |
| 2006/0174018 A1 | 8/2006 | Zhu et al. |
| 2006/0288016 A1* | 12/2006 | Sukumaran ............... 707/100 |
| 2007/0067446 A1* | 3/2007 | Jones et al. ............... 709/224 |
| 2007/0220494 A1 | 9/2007 | Spooner |
| 2007/0266136 A1 | 11/2007 | Esfahany et al. |
| 2008/0052310 A1 | 2/2008 | Rangadass |
| 2008/0086760 A1 | 4/2008 | Jiang et al. |
| 2008/0092131 A1 | 4/2008 | McIntyre et al. |
| 2008/0183856 A1 | 7/2008 | Baldwin et al. |
| 2008/0259888 A1 | 10/2008 | Terashima |
| 2008/0293367 A1* | 11/2008 | Wulff et al. ............... 455/90.3 |

OTHER PUBLICATIONS

Tech Talk #1—Automating Installations with AutoYaST, http://www.novell.com/connectionmagazine/2006/03/tech_talk_1.html, dated Mar. 2006 and downloaded on Nov. 10, 2008.

Windows XP Embedded SP2 Feature Pack 2007, http://msdn.microsoft.com/en-us/library/aa940075.aspx, last updated on Oct. 18, 2006 and downloaded on Nov. 10, 2008.

International search report and written opinion for PCT Application No. PCT/US2009/063658, dated May 31, 2010.

International search report and written opinion for PCT Application No. PCT/US2009/063623, dated Jun. 29, 2010.

International search report and written opinion for PCT Application No. PCT/US2009/063659, dated Jun. 24, 2010.

International search report and written opinion for PCT Application No. PCT/US2009/063661, dated Jul. 12, 2010.

\* cited by examiner

CREATING CROSS-TECHNOLOGY CONFIGURATION SETTINGS

BACKGROUND

Many of today's computing devices are enabled with multiple networking technologies (e.g., Ethernet, Wi-Fi, Bluetooth, etc.). To send and receive data using one of these technologies, a computing device includes a piece of hardware, such as a host interface card or host adapter bus (NIC/HBA), which serves as an interface between the remainder of computing device and the physical network medium. Additional software, such as device drivers, may be installed to enable the computing device's operating system to communicate with the NIC/HBA.

In addition to physical media types such as those mentioned above, many computing devices also may connect to one or more networks via virtual media types. For example, a corporate employee with public Internet access may connect to a corporate virtual private network (VPN) by creating a secure shell (SSH) tunnel through the Internet. Supporting a virtual media type typically does not require special hardware, as communications over the virtual network (e.g., a VPN) typically are transmitted via an existing physical network (e.g., are carried in the payload of the packets over the Internet).

Conventionally, a system administrator needs to launch multiple software programs (also known as media managers) to configure settings for different media types (either physical or virtual). For example, as shown in FIG. 1, a system administrator may need to launch a Wi-Fi configuration interface 102 through Wi-Fi manager 106 to configure Wi-Fi settings for connecting to network 122, to launch a separate Ethernet configuration interface 104 through Ethernet manager 108 to configure Ethernet settings for connecting to network 124, etc.

The settings and preferences entered by the system administrator are often handled and stored differently by different media managers. For example, as shown in FIG. 1, Wi-Fi manager 106 may store some configuration information in a database 112 accessible to Wi-Fi driver 110, and other configuration information may be passed to Wi-Fi driver 110 directly, which may store that configuration information in hardware registers in Wi-Fi card 118. Similarly, Ethernet manager 108 may store some configuration information in a file 114 at a designated location accessible to Ethernet driver 116, while other configuration information may be passed to Ethernet driver 116 directly and stored in hardware registers in Ethernet card 120.

SUMMARY

Applicants have recognized that, as the number of available media types increases steadily, the task of installing, configuring and maintaining all the necessary hardware and software is becoming a heavy burden for system administrators. In accordance with one embodiment of the invention, a unified configuration interface is provided that enables an administrator to configure multiple aspects of network connectivity. For example, the unified configuration interface may be used to configure two or more different media types.

Applicants have further appreciated that conventional systems may have multiple media managers that may handle and store configuration information differently and in several places, making it difficult and time consuming to restore settings on a computing device for the media managers in case of failures or to replicate settings from one computing device to another. In another embodiment of the invention, a single configuration file comprising settings for multiple media types may be generated based on preferences entered by a system administrator, or a single configuration file may be created by exporting, from a particular computing device, current settings for multiple media types.

Applicants have further recognized that conventional media managers are configured with dedicated interfaces, making it difficult to specify policies that involve multiple media types. In another embodiment of the invention, global configuration policies or other configuration settings that span multiple media types may be created.

In some embodiments of the invention, a network and connection provisioning framework is provided for configuring and provisioning various aspects of network connectivity. Individual media managers may implement a standardized application programming interface (API) so that they may interoperate with the network and connection provisioning framework. The standardized API may be used to ensure that configuration information is handled and stored in a standardized manner by different media managers. This facilitates the process of developing and adding new media managers, rather than having unique and proprietary interfaces for each media manager.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
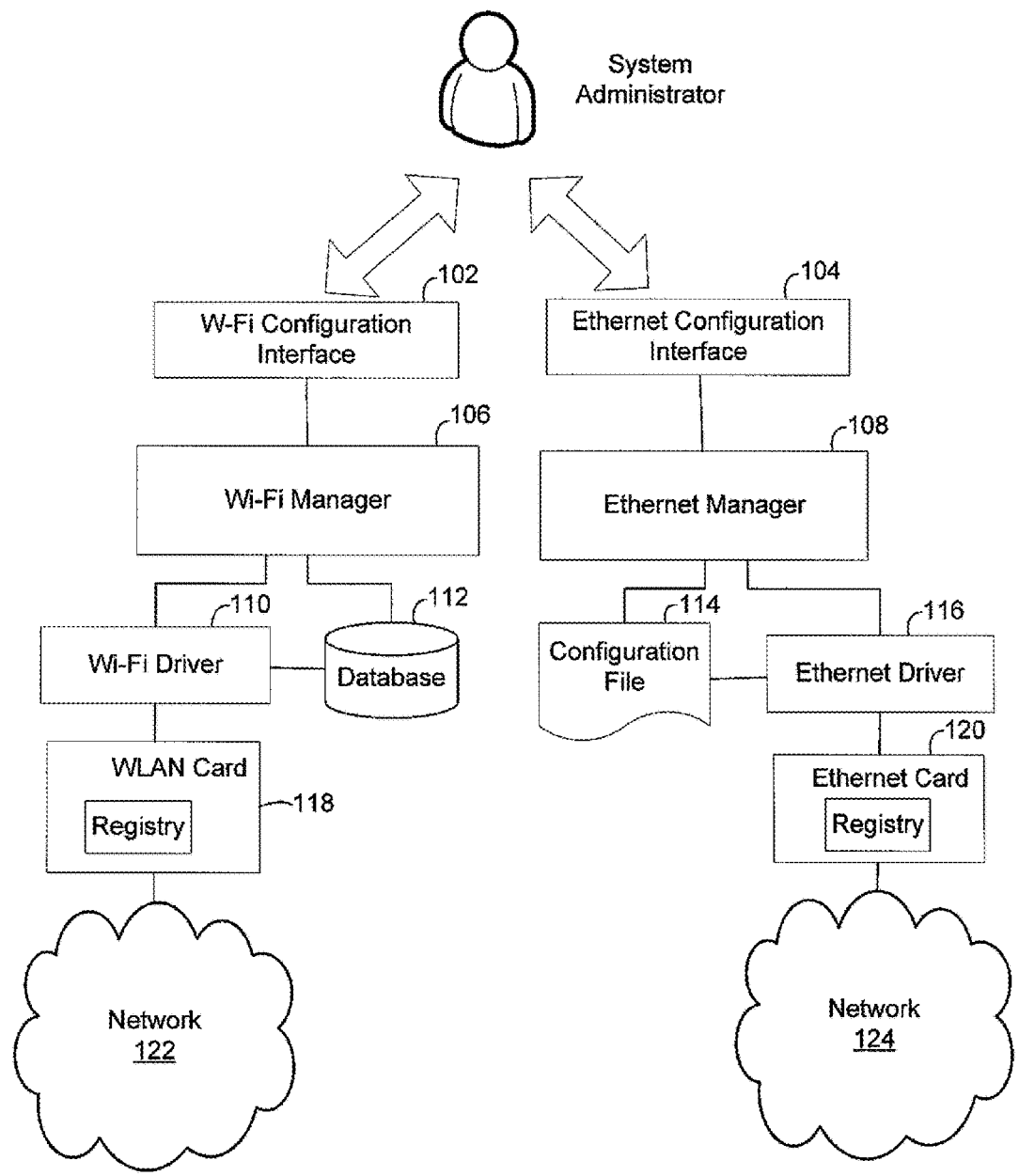
FIG. 1 illustrates a computer system comprising two media managers and a conventional system for configuring those media managers via separate configuration interfaces.

Applicants have recognized that, as the number of available media types increases steadily, the task of installing and maintaining all the necessary hardware and software is becoming a heavy burden for system administrators. This task is complicated by the fact that many media types are developed and marketed by different companies and organizations, which provide different, and often ad-hoc, configuration mechanisms. To configure a newly purchased computing device, a system administrator may need to launch a large number of different media managers to configure all media types available on that device. In addition, when a new media type becomes available, a system administrator may need to familiarize himself with the associated provisioning mechanism and to install the new media type on all devices on the network. Applicants have appreciated that these tasks can be time consuming and error prone using existing techniques.

In accordance with one embodiment of the invention, a unified configuration interface is provided that enables an administrator to configure multiple aspects of network connectivity. For example, the unified configuration interface may be used to configure two or more different media types, providing a number of advantages as discussed below.

Applicants have further appreciated that conventional systems have media managers that handle and store configuration information differently, making it difficult to collect from a computing device existing configuration settings for different media types. As a result, it is difficult and time consuming to restore settings on a computing device in case of failures or to replicate settings from one computing device to another. Although some existing media managers support restoration and replication from configuration files, each configuration file generated by a particular media manager contains information pertaining only to a particular media type associated with the media manager. To configure multiple media types, multiple configuration files would need to be provided, e.g., one for each media type. There has not been a framework that provides a unified mechanism for exporting and/or importing settings for multiple media types. For example, there has not been a unified framework in which settings can be restored and/or replicated for multiple media types using a single configuration file.

In another embodiment of Applicant's invention, a single configuration file comprising settings for multiple media types may be generated based on preferences entered by a system administrator, or by exporting, from a particular computing device, current settings for multiple media types.

Applicants have further recognized that conventional media managers do not necessarily communicate with each other, making it difficult to specify policies that involve multiple media types. In another embodiment of the invention, global configuration policies and/or other configuration settings that span multiple media types may be created, which provides a number of advantages as discussed below.

In some embodiments of the invention, a network and connection provisioning framework is provided for configuring and provisioning various aspects of network connectivity, and that implements standardized application programming interface (API) for media managers to employ to enable them to interoperate with the network and connection provisioning framework. Providing a standardized API ensures that configuration information is handled and stored in a standardized manner by different media managers.

Illustrative implementations of these and other aspects of the invention are further described below. However, it should be appreciated that the aspects of the present invention described herein can be implemented in any suitable way, and are not limited to the specific implementations described below.

Figure 2:
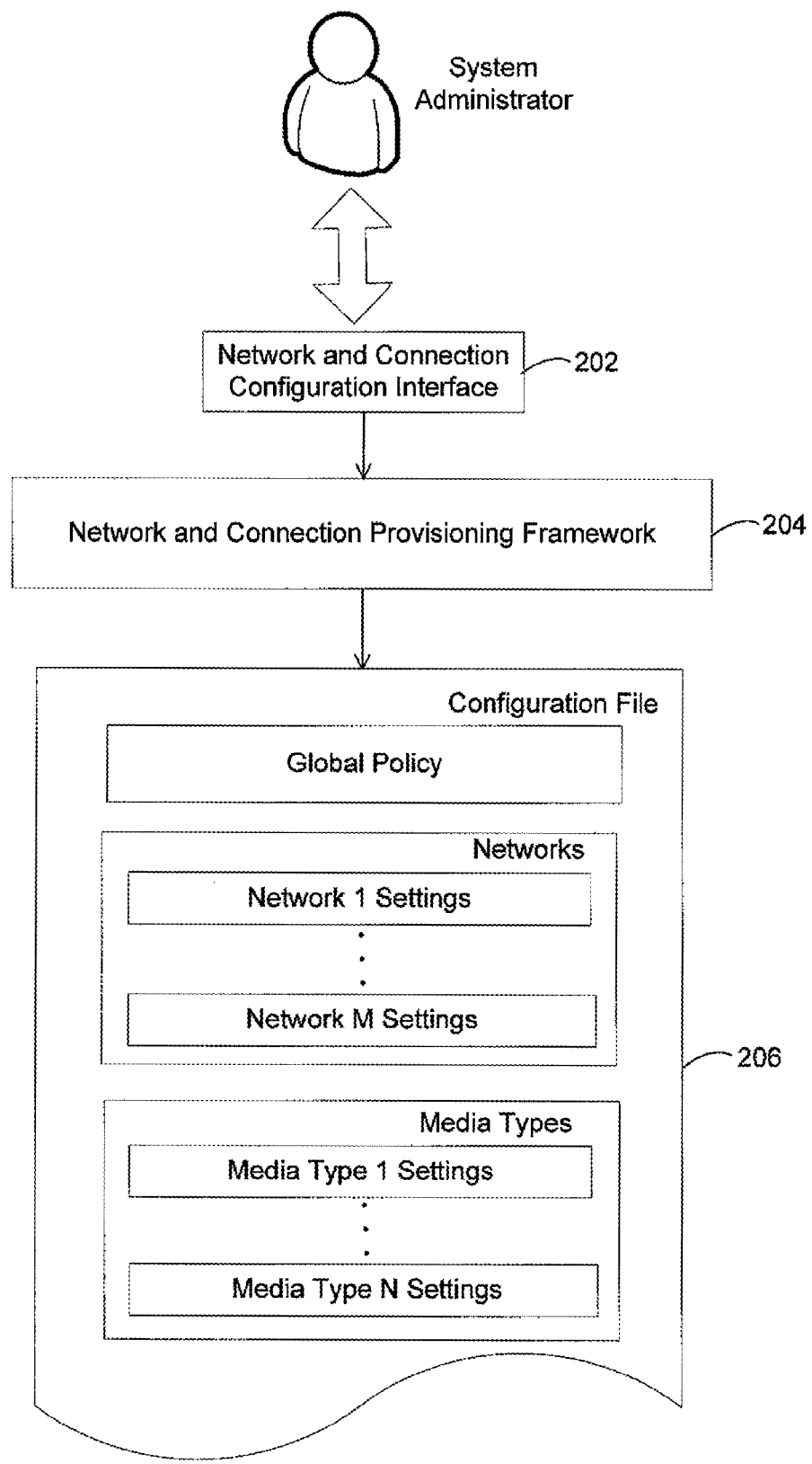
FIG. 2 illustrates a network and connection provisioning framework for configuring and provisioning multiple types of network connectivity in accordance with some embodiments of the invention.

In accordance with some embodiments of the invention shown conceptually in FIG. 2, a network and connection provisioning framework 204 is provided that presents to a system administrator a single network and connection configuration interface 202 for configuring multiple aspects of network connectivity. These aspects may include multiple networks, multiple media types, multiple connections to a same network using a same media type or different media types, etc. Any combination of desired aspects of network connectivity (e.g., any number of networks, media types, and/or connections) may be configured via interface 202, as the invention is not limited in this respect. Examples of networks include enterprise networks (e.g., corporate, government, and university networks)), public networks (e.g., WiFi hotspots at airports and public library networks), and personal home networks. Examples of media types include Wi-Fi, Ethernet, VPN, etc. These examples are presented merely for illustration as the aspects of the present invention described herein can be used with any type of network and/or media type.

In accordance with one embodiment, the network and connection provisioning framework 204 may process the information collected via the configuration interface 202, and may generate a configuration file 206 as a result of the processing. The types of information collected, the form of the configuration file, and the nature and extent of the processing of the collected information to create the configuration file are not limitations of the invention, and may vary depending on a number of factors, such as the specific aspects of network connectivity being configured, the types of configuration settings that relate thereto, etc. For example, in one embodiment illustrated in FIG. 2, configuration file 206 may comprise settings for any number of specific networks (e.g., networks 1 through M) and media types (e.g., media types 1 through N).

In accordance with a further embodiment of the invention, configuration interface 202 may also allow users to specify global policies and/or other settings relating to multiple aspects of network connectivity. In one embodiment, global policies and/or other settings may also be stored in the same configuration file 206 as the other configuration information. However, the aspect of the invention that relates to allowing the configuration of global policies is not limited in this respect, and can be implemented using one or more separated configuration files for global policies.

Global policies and/or other settings may relate to any combination of the configurable aspects of network connectivity, as the invention is not limited in this respect. For example, a user may specify via configuration interface 202 preferences of media types when attempting to connect to a particular network, (e.g., when multiple media types are available), particular settings for a first media type that may be enforced only when a second media type is in active use, etc.

It should be appreciated that the implementation shown in FIG. 2 employs a number of different inventive features, e.g., those relating to (1) providing a common interface for configuring multiple aspects of network connectivity; (2) providing a single configuration file for storing configuration information pertaining to multiple aspects of network connectivity, and (3) enabling the establishment of global policies that span multiple aspects of network connectivity. Each of these features is advantageous for one or more reasons discussed herein. However, these features are not limited to being employed together, as other embodiments contemplate each of these features being used separately or in any combination.

Figure 9:
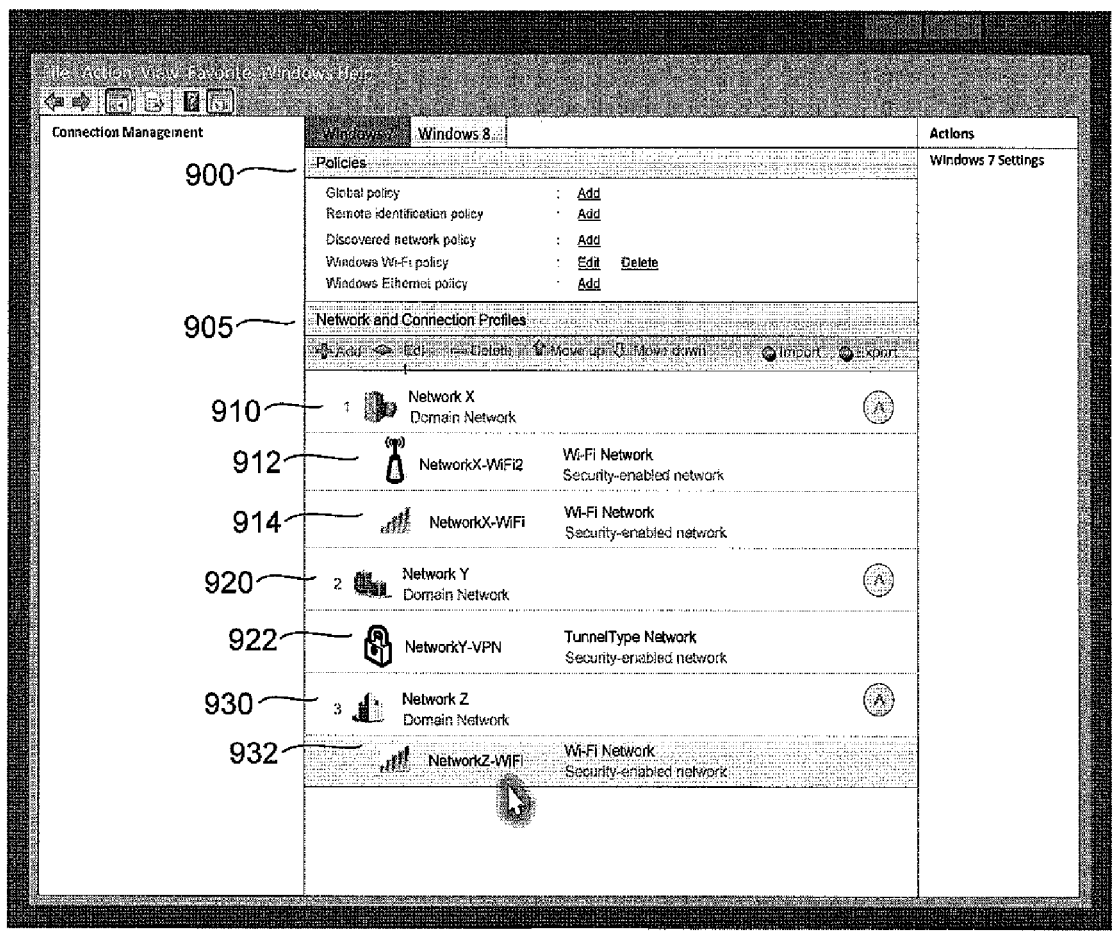
FIG. 9 illustrates an exemplary configuration interface for configuring and provisioning various aspects of network connectivity in accordance with some embodiments of the invention.

Furthermore, the aspects of the invention described herein are not limited to the particular types of configuration settings illustrated in FIG. 2. Configuration file 206 may comprise other types of information and may be structured in any suitable way. An exemplary structure is illustrated in FIG. 9 and will be discussed in greater detail below.

Figure 3:
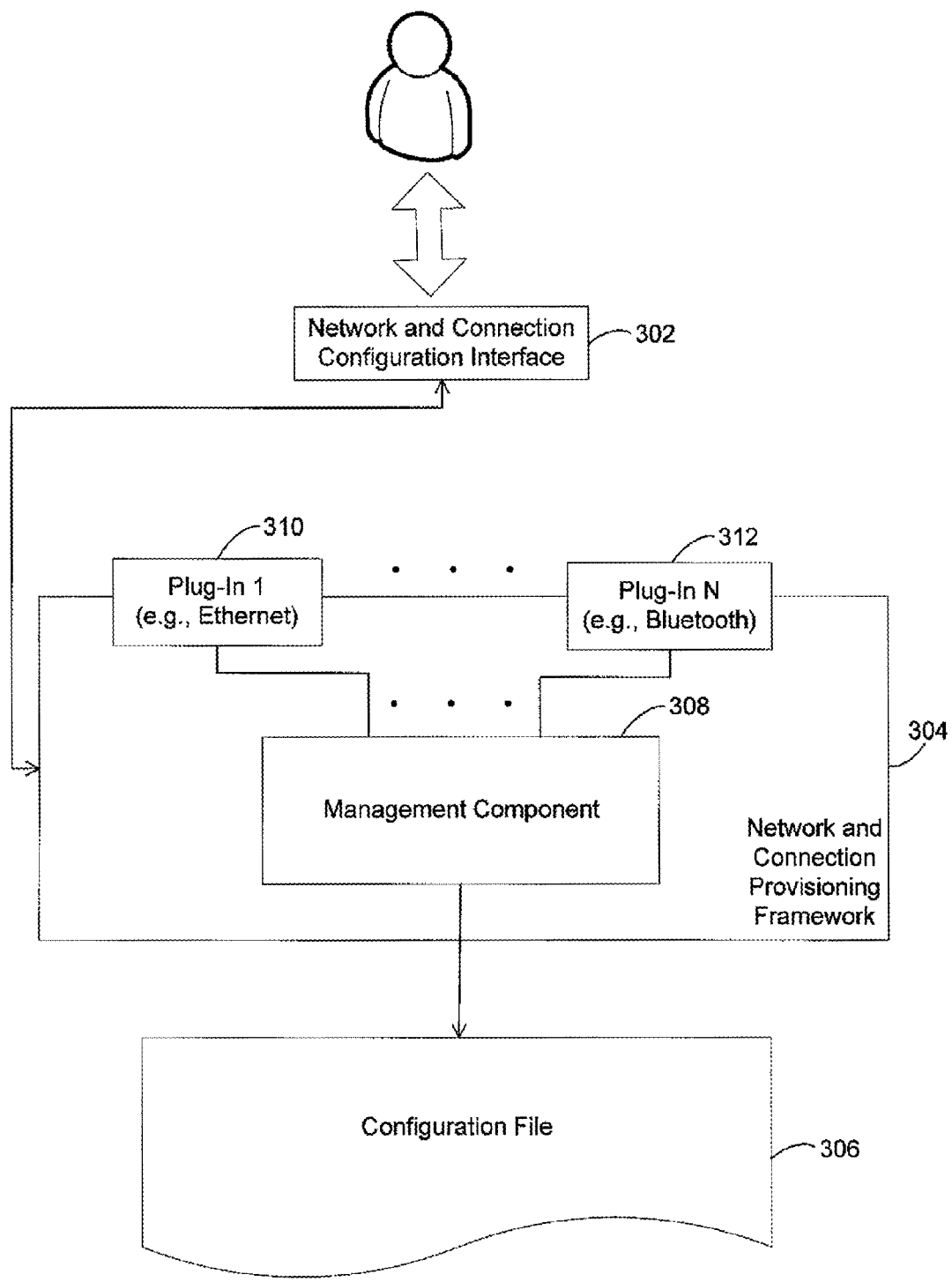
FIG. 3 illustrates a network and connection provisioning framework of the type shown in FIG. 2, implemented using plug-in modules for specific types of network connectivity in accordance with one embodiment.

As discussed above, the network and connection provisioning framework can be implemented in any suitable manner. One exemplary implementation is illustrated in FIG. 3, where network and connection provisioning framework 304 comprises a management component 308 and is configured to receive a plurality of plug-in modules, e.g., plug-in 1 through plug-in N (310-312). The plug-in modules may be developed by the same software developer(s) as the management component 308, or by different software developers. In one embodiment, the management component 308 may provide functionality that crosses all aspects of network connectivity (e.g., all networks, media types, and/or connections), and each plug-in may implement functionality directed to a particular aspect of network connectivity. Thus, a plug-in module may be loaded for each media type available on a computing device. For example, plug-in 310 may be associated with Ethernet, and plug-in 312 may be associated with Bluetooth.

The use of plug-ins allows an underlying framework to extend easily. For instance, whenever a new media type becomes available, a new plug-in may be loaded into network and connection provisioning framework 304 to handle the collection and processing of configuration information specifically pertaining to the new media type. No additional changes need to be made to framework 304. In the embodiment of FIG. 3, to configure both the existing media types and any newly added media type, a system administrator may launch the same configuration interface 302. In accordance with one embodiment, although configuration interface 302 may comprise new interface elements implemented by the new plug-in, these new interface elements may be organized and presented in a way that is already familiar to the system administrator, so that minimal learning effort is required to configure the new media type.

In one embodiment, the use of plug-ins may shield the management component 308 of the network and connection provisioning framework from the implementation details of each media type. As mentioned above, each plug-in may implement its own interface elements to be presented through the configuration interface 302. Thus, in one embodiment, the configuration interface 302 may simply be a shell hosting various interfaces implemented by the plug-ins, and the software for presenting the configuration interface 302 need not deal with the peculiarities associated with different media types. For example, the management component 308 need not "understand" what information is relevant and what options to present to the system administrator in configuring an Ethernet connection. All of that information will be supplied by a plug-in module associated with Ethernet, e.g., plug-in 310 in FIG. 3.

The plug-ins and management component can be adapted to share the processing of information in any suitable manner. For example, in one embodiment, plug-ins may perform initial processing of the information collected through the configuration interface 302. In this way, management component 308 need not have complete knowledge of how information should be handled and stored for every media type. The management component may simply "package" processed information received from the plug-ins into a single configuration file. Alternatively, depending on the format of the one or more configuration files created by the network and connection provisioning framework 304 and the formats in which the plug-ins provide the configuration information, the management component 308 may perform some further processing, e.g., extracting and regrouping information provided by the plug-ins, or some other processing.

It should be appreciated that aspects of the invention described herein are not limited to the use of plug-ins, as the network and connection provisioning framework 204 (illustrated in FIG. 2) alternatively can be implemented in other ways. Also, when plug-ins are used, the invention is not limited to how information collection, processing and other functions are distributed between the management component and the various plug-ins.

In accordance with one embodiment, in addition to obtaining configuration preferences from a system administrator, the network and connection provisioning framework 204 (illustrated in FIG. 2) may also collect existing configuration settings that are already provisioned on a computing device. This is referred to as "exporting" existing settings. In some embodiments of the invention, the network and connection provisioning framework may interface with multiple media managers to retrieve configuration settings, including different types of media managers that handle and store information differently. Media managers may reside on a computing device to manage various aspects of network connectivity on the computing device. For example, a media manager may be associated with a media type available on the computing device and may have access to existing configuration settings pertaining to that media type.

Figure 4:
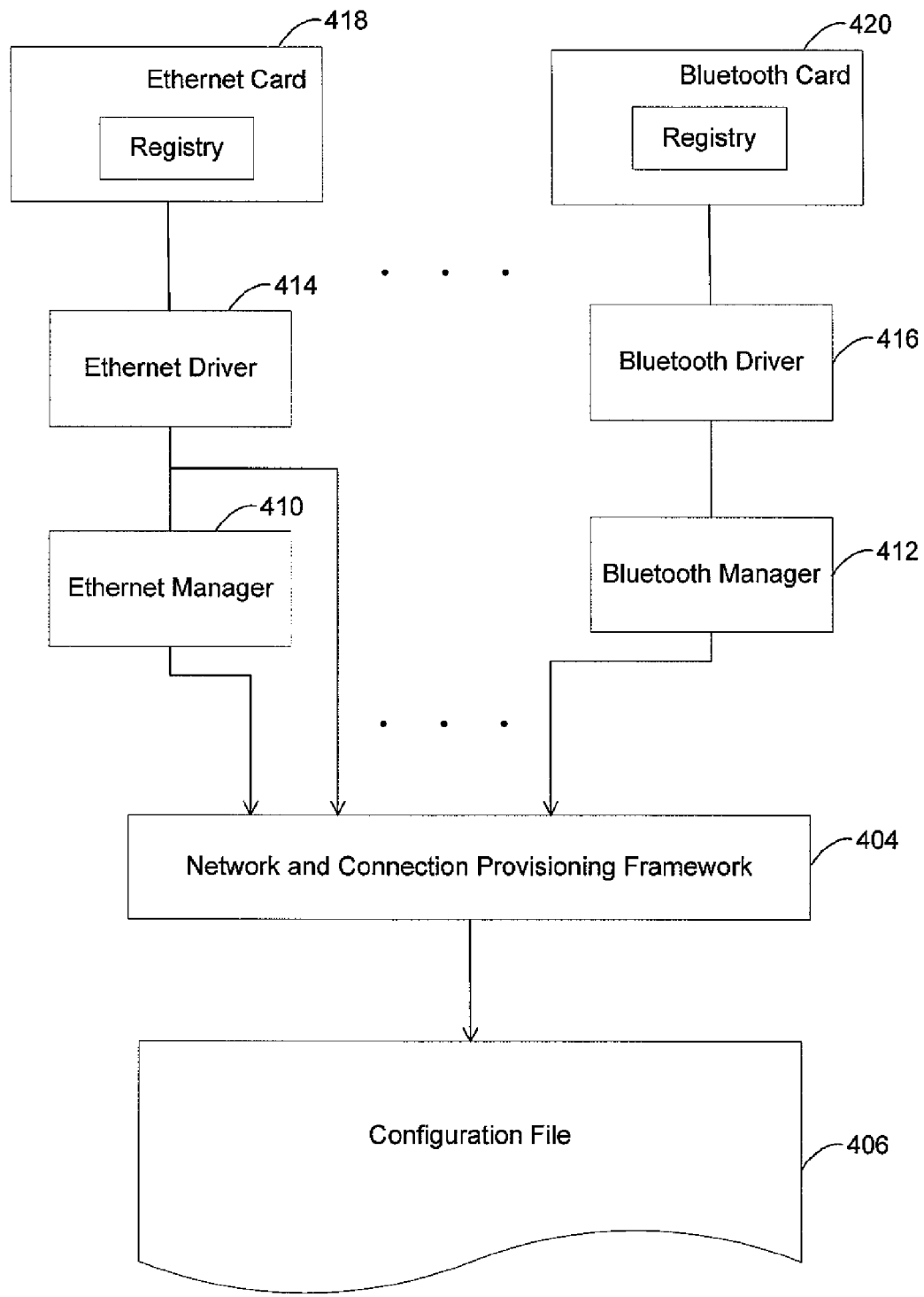
FIG. 4 illustrates a network and connection provisioning framework adapted to receive configuration information exported from media managers and/or device drivers in accordance with some embodiments of the invention.

The retrieval of configuration settings can be done in any suitable way, an example of which is shown in FIG. 4. As one example, network and connection provisioning framework 404 may interface with Ethernet manager 410 and Bluetooth manager 412 to retrieve configuration settings for Ethernet and Bluetooth, respectively. In some embodiments, the network and connection provisioning framework 404 may also interface directly with device drivers (e.g., if the media managers do not provide an interface through which all desired configuration information can be retrieved). An example of this is shown in FIG. 4, where network and connection provisioning framework 404 interfaces both with Ethernet manager 410 and with Ethernet driver 414). Additionally, or alternatively, network and connection provisioning framework 404 may retrieve configuration information from any other suitable location (e.g., a database or a configuration file at a known location).

It should be appreciated that the aspects of the invention described herein are not limited to any particular manner in which the network and connection provisioning framework collects existing configuration settings, as this may be done in any suitable way.

Figure 5:
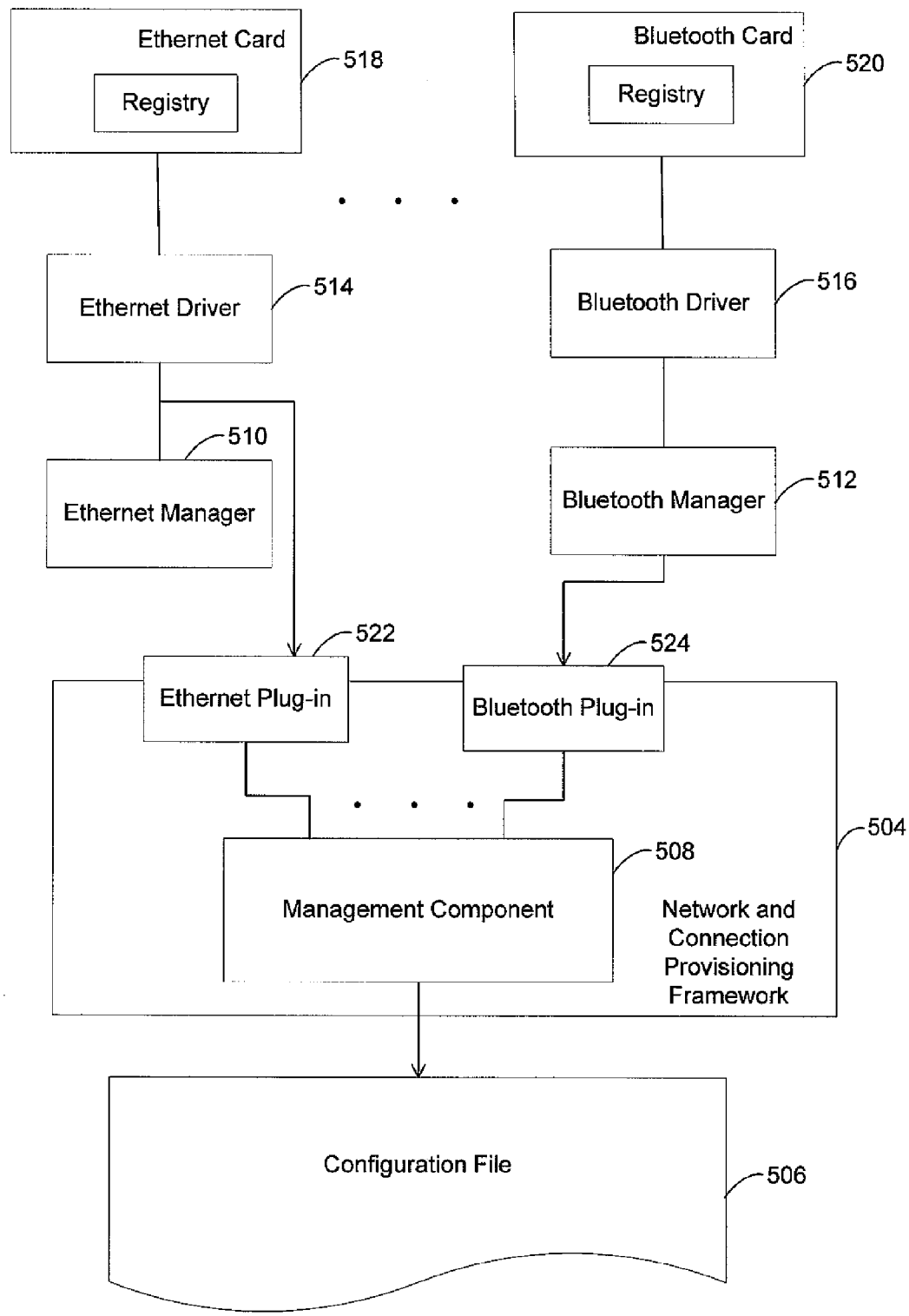
FIG. 5 illustrates a network and connection provisioning framework of the type shown in FIG. 4, implemented using plug-in modules for specific types of network connectivity in accordance with one embodiment.

As with the embodiment of FIG. 3 discussed above, a network and connection provisioning framework that has the ability to collect existing configuration settings may be implemented using plug-ins. FIG. 5 shows an embodiment in which the network and connection provisioning framework 504 comprises a management component 508 and a plurality of plug-ins (e.g., 522-524), where the plug-ins interface with media managers and/or device drivers to collect configuration settings. As discussed above, the use of plug-ins may shield management component 508 from the implementation details of various media types. For example, Ethernet plug-in 522 may collection configuration information directly from Ethernet driver 514 and/or Ethernet manager 510, and process the collected information before it is passed on to management component 508. Bluetooth plug-in 524 may collect configuration information from Bluetooth driver 516 and/or Bluetooth manager 512 and process the collected information before passing it on to management component 508. As discussed above, the aspect of the invention directed to collecting existing configuration settings is not limited by the manner in which plug-ins collect configuration information. They may interface with media managers and/or device drivers, and/or they may obtain configuration information from databases, configuration files or any other suitable sources.

Figure 6:
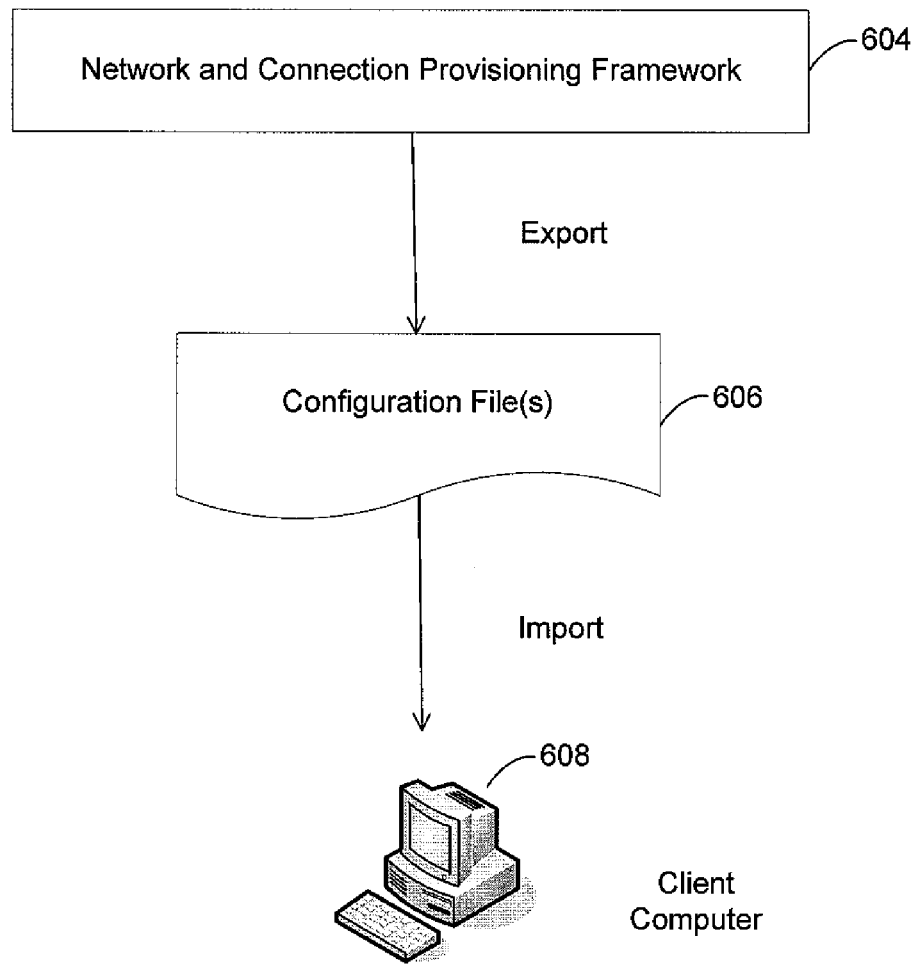
FIG. 6 illustrates a process of importing to a client computer a configuration file created by a network and connection provisioning framework in accordance with some embodiment of the invention.

Once one or more configuration files are created (e.g., by an administrator via a configuration interface or by exporting existing settings), the files may be saved on any suitable storage medium. As shown in FIG. 6, the configuration file(s) 606 created by network and connection provisioning framework 604 may also be transferred to a client device 608 where it is used to provision the client device according to the configuration settings in the file(s). The transfer may take place in any suitable manner, as the invention is not limited in this respect. For example, the configuration file(s) may be copied to the client device via a transportable physical storage medium (e.g., a smart card, a flash drive, etc.). Alternatively, the configuration file may be placed in a store (e.g., a web site) accessible to the client device and be accessed by the client device therefrom.

In some embodiments, a provisioning component may be installed on client devices to provision the client device according to the configuration settings in the configuration file(s). In accordance with one embodiment of the invention, the provisioning component may be considered as part of the network and connection provisioning framework, but it should be appreciated that the aspects of the invention described herein are not limited in this respect, as the components of the system that present a user interface to create one or more configuration files and the provisioning component on the client devices may be viewed as separate system components.

Upon receiving one or more configuration file(s) 706, provisioning component 708 may parse the file(s) to extract configuration information. When a configuration file includes information for multiple aspects of network connectivity, provisioning component 708 may be capable of discerning which pieces of information are relevant for which aspects of network connectivity and may forward to each component on the client device to be configured (e.g., each media manager) only the information relevant for that component. For example, provisioning component 708 may extract all information relating to Bluetooth (e.g., global policies that apply to all media types, settings for networks on which Bluetooth is available, and settings directed to some specific Bluetooth connections) and forward all such information to Bluetooth manager 712. Depending on the format of the received configuration file and the format in which Bluetooth manager 712 expects to receive configuration information, provisioning component 708 may simply pass along the configuration information, or may process it to be more compatible with the Bluetooth manager 712. The Bluetooth manager 712 may then configure Bluetooth driver 716 and/or Bluetooth card 720 according to the received configuration information.

Figure 7:
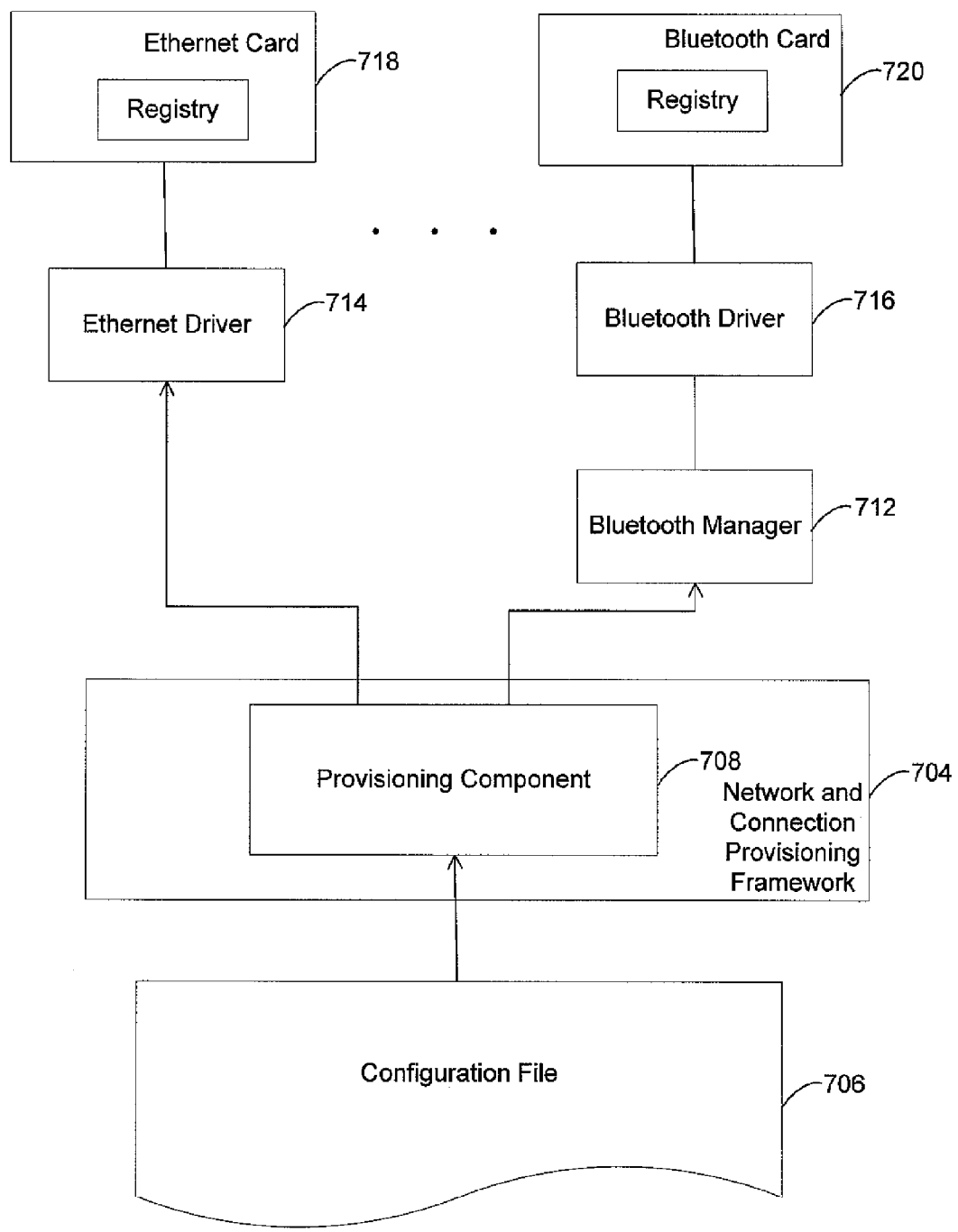
FIG. 7 illustrates a network and connection provisioning framework comprising a provisioning component for provisioning on a client computer configuration settings for multiple types of network connectivity via a single configuration file in accordance with some embodiments of the invention.

In addition, and/or as an alternative, to provisioning the client device by interfacing with one or more media managers, provisioning component 708 may provision the received configuration settings by interfacing with device drivers. For example, in the embodiment shown in FIG. 7, provisioning component 708 may extract all configuration information pertaining to Ethernet and forward it directly to Ethernet driver 714, which in turn configures Ethernet card 718 accordingly. Again, depending on the format of the received configuration file and the format in which Ethernet driver 714 expects to receive configuration information, provisioning component 708 may or may not process the extracted configuration information before forwarding.

Figure 8:
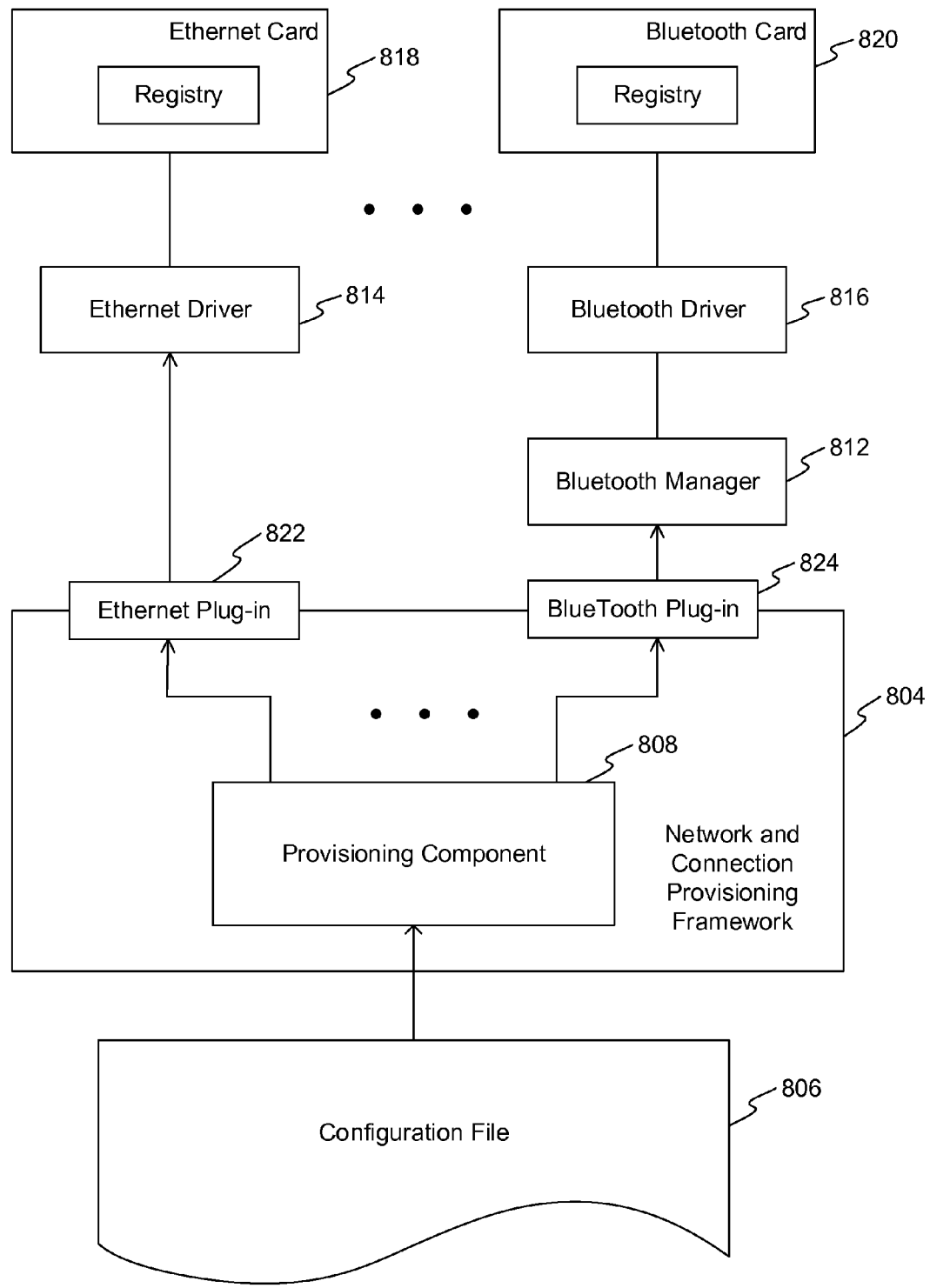
FIG. 8 illustrates a network and connection provisioning framework of the type shown in FIG. 7, implemented using plug-in modules for specific types of network connectivity in accordance with one embodiment.

Much like the aspect of the network and connection provisioning framework that presents a user interface to a system administrator and creates one or more configuration files, in one embodiment the provisioning component of the system may be implemented using a framework and plug-in modules on a client device. One such embodiment is illustrated in FIG. 8, in which provisioning component 808 interacts with plug-in modules that are installed on the client side. For instance, provisioning component 808 may extract configuration information pertaining to Ethernet and pass it to Ethernet plug-in 822, which may provide the information to Ethernet driver 814 and may optionally process the configuration information to convert it into a format expected by Ethernet driver 814. Ethernet driver 814 may then configure Ethernet card 818 according to the configuration information received from Ethernet plug-in 822. Depending on the requirements of Ethernet driver 814, Ethernet plug-in 822 may optionally store some of the configuration information in a database or a file accessible by Ethernet driver 814. As a further example, provisioning component 808 may extract configuration information pertaining to Bluetooth and pass it to Bluetooth plug-in 824, which may provide the information to (and optionally convert the configuration information into a format expected by) the Bluetooth manager 812. The Bluetooth manager 812 may then configure Bluetooth driver 816 and/or Bluetooth card 820 according to the received configuration information. In this way, the plug-ins serve as an interface (and optionally a translation layer) between provisioning component 808 and the components on the client to be provisioned (e.g., media managers and/or device drivers).

One of the advantages to using plug-in modules is shielding provisioning component 808 from the particular ways in which the components being provisioned (e.g., media manager and/or device drivers) consume configuration information. However, the aspects of the invention described herein are not limited to implementing the provisioning component using plug-ins.

Figure 10:
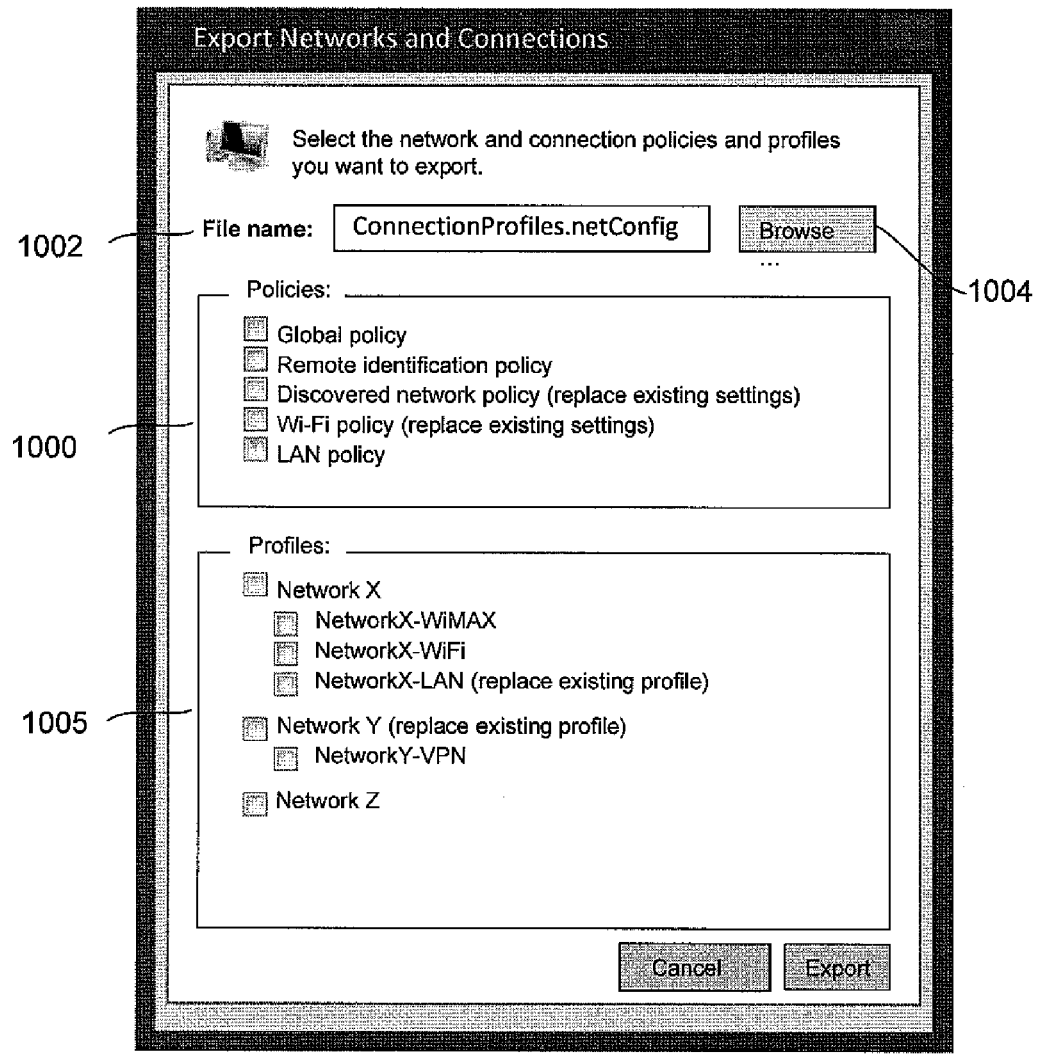
FIG. 10 illustrates an exemplary interface for exporting, from a computing device, existing configuration settings in accordance with some embodiments of the invention.
Figure 11:
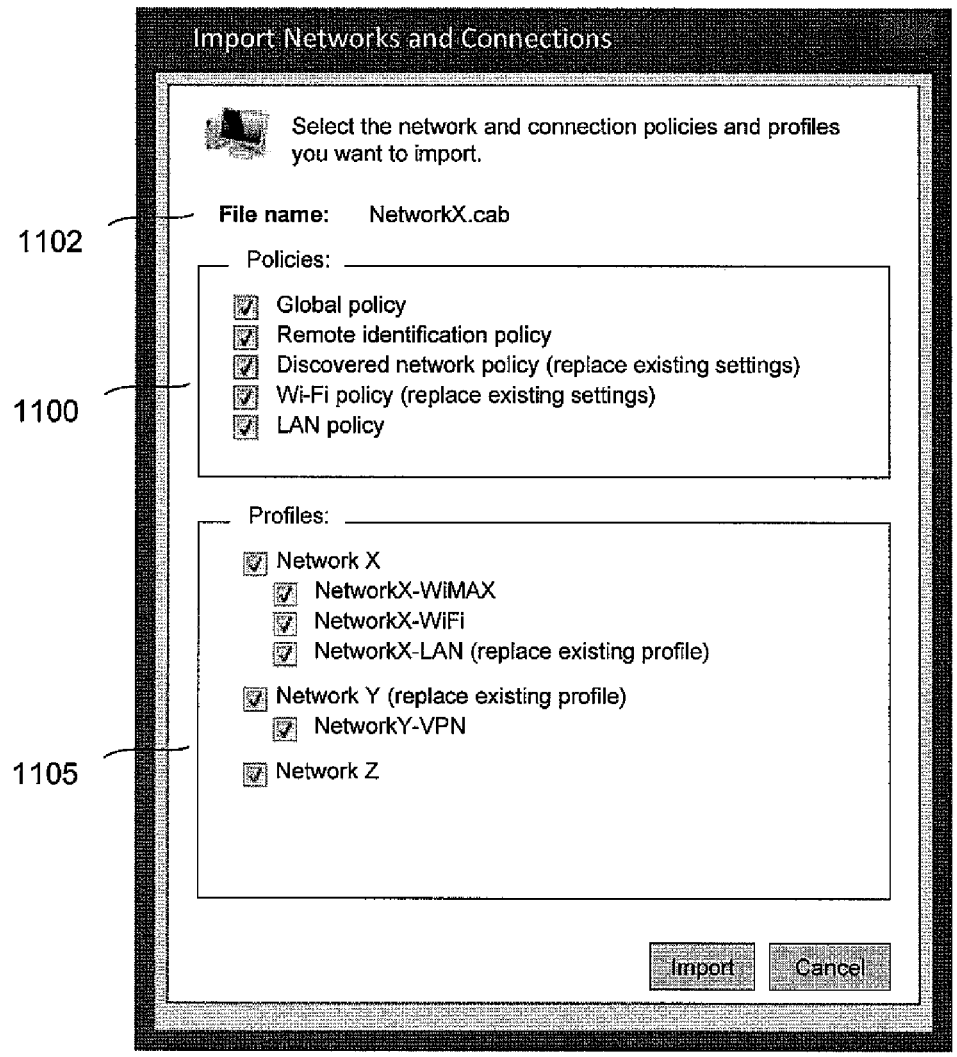
FIG. 11 illustrates an exemplary interface for importing configuration settings from a configuration file in accordance with some embodiments of the invention.

FIGS. 9-11 show some examples of user interfaces that a network and connection configuration interface may present to an administrator in accordance with some embodiments of the invention. It should be appreciated that the aspects of the present invention described herein are not limited to using the particular user interfaces illustrated in FIGS. 9-11, as any suitable interfaces may be used.

FIG. 9 shows an example of a main configuration interface that may be used to perform a number of configuration tasks, such as adding, editing, and deleting various policies and settings, as well as exporting and importing settings to/from configuration files. In the example of FIG. 9, policies may be displayed in section 900, near the top of the page. Options such as "Add," "Edit," and "Delete" may be displayed next to each policy category to allow a user to add, edit, or delete policies. "Global policy" may comprise configuration information that is not limited to any particular network or media type. For example, it may comprise a policy specifying that at most one connection is allowed from the client device at any time, a policy specifying that the client device may connect to at most one network at any time (although the number of connections to that network is not limited), etc. "Remote identification policy" may indicate whether direct access technology is allowed, and if so, an administrator may be prompted to specify a URL for remote network identification. "Discovered network policy" may specify actions to be taken when a network is discovered, e.g., whether or not to connect automatically without prompting for user confirmation. Other policies may also be included, for example, a policy requiring that all wireless media be disabled when battery is low.

As shown in FIG. 9, policies section 900 may also comprise any suitable policies associated with specific media managers, e.g., the Windows Wi-Fi manager and the Windows Ethernet managers in FIG. 9. For example, "Windows Wi-Fi policy" may comprise policies that apply to all Wi-Fi connections, such as prohibiting ad-hoc Wi-Fi connections or prohibiting Wi-Fi connections to unsecured networks. Of course, this is just an example as any suitable policy or policies can be specified.

As shown in FIG. 9, network and connection profiles may be organized and displayed in section 905. For example, there may be sub-sections, 910, 920, and 930, each of which corresponds to a particular network. While three sub-sections are shown in the example of FIG. 9, it should be appreciated that any number may be used. Each sub-section (e.g., 910) may comprise a profile for the corresponding network (e.g. Network X). Various types of information about the network may be stored in this profile, including network name, an icon to be displayed to identify the network, network category (e.g., work, home, etc.), and policies associated with the network (e.g., allow at most one connection to the network at any time, do not allow connection to another network while connected to this network, etc.).

Each sub-section may also comprise profiles for available connections. Additional information may be displayed adjacent to each connection, for instance, to indicate the associated media type and whether the connection is secured. For example, as shown in FIG. 9, Network X (910) may have profiles for two connections, NetworkX-WiFi2 (912) and NetworkX-WiFi (914), both of which are secured Wi-Fi connections. Any suitable information may be stored in each of these profiles, including encryption type, SSID (Service Set Identifier), etc.

Similarly, Network Y (920) may comprise a profile for a secured VPN connection 922, and Network Z (930) may comprise a profile for a secured Wi-Fi connection 932.

It should be appreciated that any number of network and connection profiles may be displayed and any suitable information may be stored in these profiles, as the aspects of the invention discussed herein are not limited to use with a user interface that is limited in either regard.

The illustrative embodiment shown in FIG. 9 may also allow a user to add, edit, delete, or re-organize the displayed profiles. For example, these tasks may be performed by clicking on the menu buttons displayed under the section heading "Network and Connection Profiles." There may also be menu buttons for, respectively, importing and exporting settings. Clicking on either of these buttons may bring up a new page for selecting the profiles to be imported or exported.

FIG. 10 shows an example of a page that may be displayed when a user clicks on the "export" button shown in FIG. 9. There may be a "file name" field 1002 where the user may enter a name for the configuration file to which the selected settings are to be exported. There may also be a "browse" button 1004 which the user may use to look through a directory structure to identify a location and/or a name for the configuration file. Existing policies and profiles may be displayed in two separate sections (e.g., 1000 and 1005). The user may select any number of policies and/or profiles to be exported to the configuration file, and may indicate whether each policy or profile should replace an existing version.

FIG. 11 shows an example of a page that may be displayed when a user clicks on the "import" button shown in FIG. 9. This page may show the name (1102) of the configuration file being imported (e.g., NetworkX.cab). Policies and profiles stored in the configuration file may be displayed (e.g., in sections 1100 and 1105, respectively), so that the user may select which policies and/or profiles are to be imported to a client device.

As discussed above, in accordance with one embodiment, a standardized format is used for configuration files to configure one or more aspects of network connectivity for one or more client devices. The standardized format may ensure that information is stored in a logical manner, thereby facilitating dissemination of configuration settings to different software and/or hardware components that consume the settings. The standardized format can take any form, as the aspect of the invention that relates to using a standardized format is not limited to any particular format. One exemplary format is shown in FIG. 12 and is described below solely for the purpose of illustration, as other formats can be used.

Figure 12:
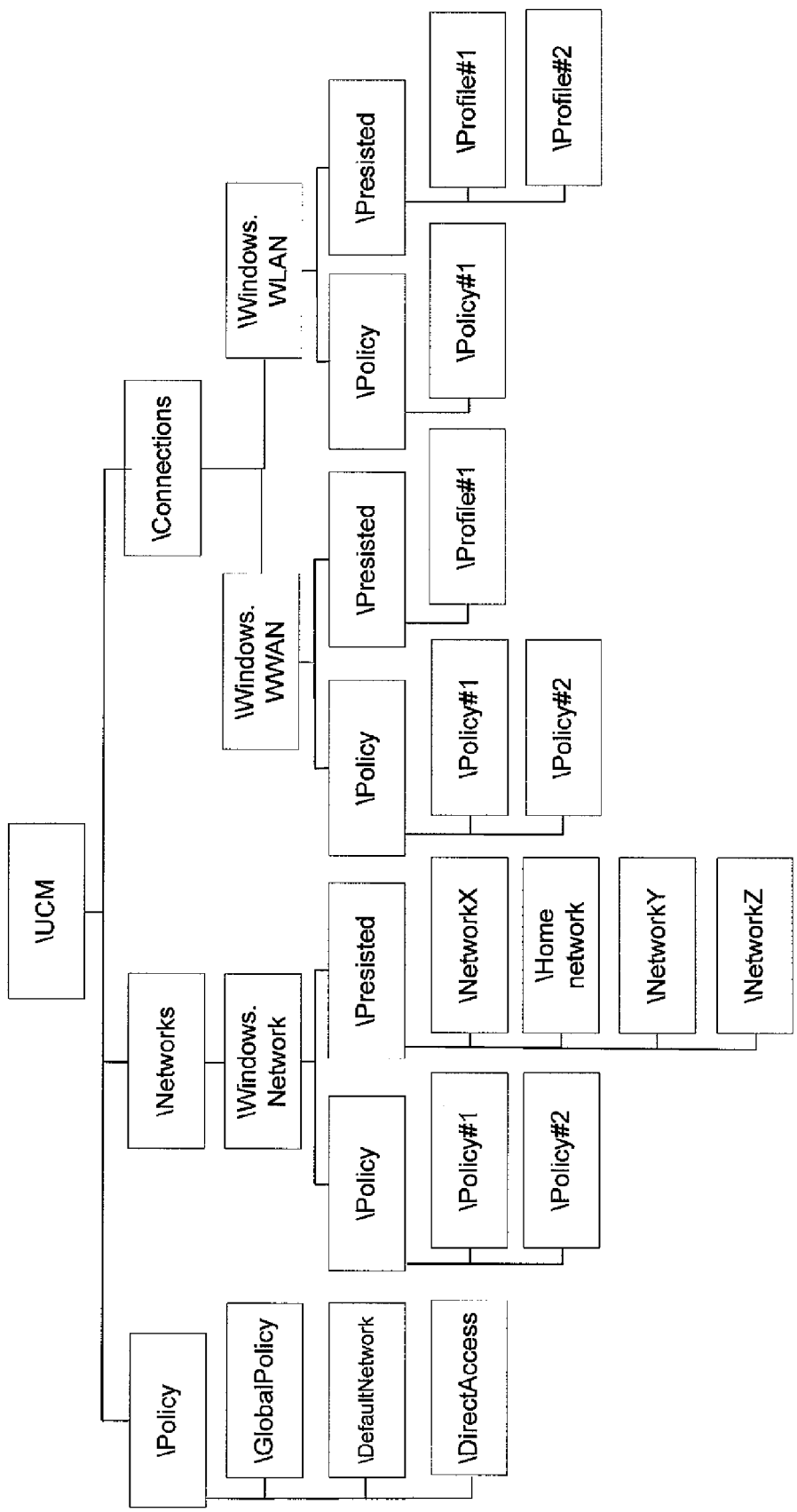
FIG. 12 illustrates an example of a standardized hierarchical structure for storing configuration information in accordance with some embodiments of the invention.

In the embodiment illustrated in FIG. 12, configuration information is organized into a hierarchical tree structure according to a framework referred to herein as the Unified Connection Manager (UCM) framework. This framework provides a standardized format for storing configuration information in a logical fashion so the various pieces of configuration information may be located and disseminated efficiently.

Each node in the hierarchical tree structure is a UCM namespace element, which may contain data as well as sub-namespaces. The addressing mechanism for namespace elements is similar to that for files and subdirectories in a conventional hierarchical directory structure. For instance, in the tree structure of FIG. 12, the root node is the \UCM namespace, which comprises three sub-namespaces: \UCM\Policy, \UCM\Networks, and \UCM\Connections. Unlike a conventional subdirectory, however, each of these sub-namespaces may comprise data and/or further sub-namespaces. In other words, there is no file vs. directory distinction within the UCM framework.

Namespace element \UCM\Policy may be used to store configuration information that is not specific to any particular network or media type, such as the global policies discussed in connection with FIG. 9 above. These policies may be stored directly in the namespace element \UCM\Policy, or they may be arranged logically into further sub-namespaces, such as \UCM\Policy\GlobalPolicy, \UCM\Policy\DefaultNetwork, and \UCM\Policy\DirectAccess, shown in FIG. 12.

FIG. 12 also shows a sub-namespace \UCM\Networks\, which may be used to store configuration information associated with the Network Layer (Layer 3) in the Open Systems Interconnection (OSI) model of networking. The Network Layer is below the Transport Layer (Layer 4) and above the Data Link Layer (Layer 2). It receives hop-to-hop communication services from the Data Link Layer and provides source-to-destination services to the Transport Layer. In accordance with one embodiment all Layer 3 information is grouped into the sub-namespace \UCM\Networks, so that the information may be located and distributed quickly and easily to software modules that handle Layer 3 operations.

For example, FIG. 12 shows a sub-namespace of \UCM\Networks\, namely, \UCM\Networks\Windows.Network. This sub-namespace may be associated with a media manager called Windows.Network. This media manager may be a stand-alone software program or a plug-in to the network and connection provisioning framework, and it may be supplied by the provider of an operating system of a client device to be configured, or by any third-party software vendor. Furthermore, this media manager may implement one or more UCM-related application programming interface (API) functions. The API functions may be used to ensure that the media manager is compatible with the network and connection provisioning framework, e.g., that the media manager "understands" how information is stored in UCM namespaces and is capable of providing information in accordance with the UCM convention. Some exemplary API functions will be further discussed below merely as examples, as other and/or different API functions are also possible.

As shown in FIG. 12, \UCM\Networks\Windows.Network may comprise two sub-namespaces: \UCM\Networks\Windows.Network\Policy and \UCM\Networks\Windows.Network\Persisted*. The former sub-namespace may be used to store policies that apply to all networks. For example, it may comprise a policy specifying that Ethernet is preferred over Wi-Fi regardless of the network to which the computing device wishes to connect. The latter sub-namespace may be used to store profiles for individual networks. As shown in FIG. 12, there may be a profile for each of Network X, Homenetwork, Network Y, and Network Z. These profiles may contain any suitable information, including the illustrative information discussed in connection with FIG. 9 above.

FIG. 12 also shows a sub-namespace \UCM\Connections\, which may be used to stored configuration information associated with the Data Link Layer (Layer 2 in the OSI model). It may further comprise at least two sub-namespaces corresponding, respectly, to two media managers: Windows.WWAN and Windows.WLAN, where WWAN refers to Wireless Wide Area Network and WLAN refers to Wireless Local Area Network. As shown in FIG. 12, there may be further sub-namespaces (e.g., \Policy and \Persisted*) in each of these sub-namespaces. For example, \UCM\Connections\Windows.WLAN\Policy may be used to stored policies that apply to all WLAN connections. The sub-namespace \UCM\Connections\Windows.WLAN\Persisted* may be used to store profiles for individual connections. As shown in FIG. 12, there may be two profiles stored in this sub-namespace. One may be associated with WLAN connections to Network X, while the other may be associated with WLAN connections to Homenetwork. Examples of information stored in each of these profiles can be found in the above discussion in connection with FIG. 9.

The UCM framework may be used to organize information logically to facilitate efficient access of information. However, as discussed above, the aspect of the invention that relates to employing a standard format is not limited to the use of the UCM framework or even to using a hierarchical structure for storing configuration information in a configuration file, nor is it limited to the use of the OSI networking model or the types of configuration information mentioned in connection with the above-described embodiment. Any suitable standardized format can be employed. In addition, while a standardized format for a configuration file may be used with any of the other aspects of the invention described herein, none of those other aspects are limited to employing a configuration file organized according to a standardized format.

As discussed above, in accordance with some embodiments, a media manager or a plug-in module may implement a set of API functions to interoperate with the network and connection configuration framework. Having a unified set of API functions facilitates the creation of the framework and the media managers (and/or plug-ins), as the interface therebetween is standardized. For example, in the above-described embodiments employing the UCM framework, some of the following API functions may be implemented by a plug-in module. However, it should be appreciated that the aspect of the present invention that relates to establishing a unified set of API functions is not limited to the particular API functions employed below.

| Interface Name | API Functions |
| --- | --- |
| INamespaceHelper | SetElement |
| IProfileManagement | CreateNewProfile, EditProfile, DeleteProfile, Compare |
| IUCMProfileReport | get__HeadingFormat, get__HeadingValues, get__PropertyCount, GetPropertyDisplayName, GetPropertyValueFormat, GetPropertyValues |
| IUCMProfileReportAsXML | get__XMLElementString |
| IProfileImport | SetProfile, RemoveProfile, Prepare, Complete |
| IProfileExport | GetProfile, Prepare, Complete |
| IProfileContext | Phase, UserToken, GetProfileType, ProfileSource, Root, ProvisioningFileName, Result, TransactionHandle, ExecutionContext, OperationType |
| IProvisioningService | ImportProfile, ExportProfile, Accept, SetExternalTransaction |

The interfaces INamespaceHelper, IProfileManagement, IUCMProfileReport, and IUCMProfileReportAsXML may be implemented by media managers or plug-ins on the server side (e.g., those that populate profiles with configuration settings and create a configuration file comprising various profiles). The interfaces IProfileImport, IProfileExport, IProfileContext, and IProvisioningService may be implemented by media managers or plug-ins on the client side (e.g., those that provision on a client computer configuration profiles received via a configuration file). However, it should be appreciated that the aspect of the invention that relates to a unified set of API functions is not limited to such a distinction between server-side and client-side functionalities.

The SetElement function takes as a parameter a namespace element, and sets that element as the namespace element to be operated on. For instance, the input element may be a namespace in which profiles are created and/or removed (e.g., \UCM\Connections\Windows.WLAN\Persisted*, as shown in FIG. 12). Alternatively, it may be a namespace corresponding to a particular profile (e.g., \UCM\Networks\Windows.Network\Persisted*\NetworkX, as shown in FIG. 12).

The CreateNewProfile function may create a new namespace element, which may be a profile that is either empty or populated with default settings. Alternatively, the function may bring up a page via which a user may enter settings to be stored in the new profile. The function may take four input parameters: parent element, parent window handle, profile type, and child element. The parent element may be a parent of the profile being created. For example, if a profile is being created for a connection, a parent element may be a corresponding network element. If no parent element is designated, the parent element parameter may be NULL. The parent window handle parameter may be used when creating a child window, and the profile type may indicate whether the profile is per user or per client device. The child element may be the new namespace element in which the new profile is stored.

The EditProfile function may be called to edit an existing profile, and may bring up a page with various editing options. Before returning, this function may persist the edited profile back into the namespace. The EditProfile function may take four input parameters: parent element, parent window handle, profile type, and profile. The parent element may be a parent of the profile being edited. For example, if a profile for a connection is being edited, a parent element may be a corresponding network element. If no parent element is designated, the parent element parameter may be NULL. The parent window handle parameter may be used when creating a child window, and the profile type may indicate whether the profile is per user or per client device. The child element may be a namespace element corresponding to the profile being edited.

The DeleteProfile function may be called before a profile is removed, and it may take four input parameters: parent element, parent window handle, profile type, and profile. The parent element may be a parent of the profile being deleted. For example, if a profile for a connection is being deleted, a parent element may be a corresponding network element. If no parent element is designated, the parent element parameter may be NULL. The parent window handle parameter may be used when creating a child window, and the profile type may indicate whether the profile is per user or per client device. The child element may be a namespace element corresponding to the profile being deleted. The DeleteProfile function may prompt a user for confirmation before removing the profile and may notify the parent element that a child is being removed. It may also support bulk remove, e.g., when a network element is being removed, all connection elements associated with that network may also be removed.

The Compare function may take as input two profiles and return a value indicating whether the input profiles are identical, and, if they are not, indicate some information about how they compare. For example, if the two input profiles are identical then 0 is returned. If the two profiles are not identical, then, if the first input profile contains all of the information contained in the second input profile, then a positive integer (e.g., 1) is returned, otherwise, a negative integer (e.g., −1) is returned. These values are merely examples, as the aspect of the invention relating to comparing profiles is not limited in this respect.

The get_HeadingFormat function may take any or no inputs and may return a format string indicating the format of a heading printed for the particular namespace element. The format string may be loaded from a resource file.

The get_HeadingValues function may take no inputs and return an array of insertion values that can be inserted into a get_HeadingFormat insertion string.

The get_PropertyCount function may take any or no inputs and return a value indicating the number of customer reporting properties for the profile.

The GetPropertyDisplayName function may receive an index of a property (e.g., a number between 0 and the value of get_PropertyCount minus 1) and return a string indicating a display name of the property. The name may be loaded from a resource file.

The GetPropertyValueFormat function may receive an index of a property (e.g., a number between 0 and the value of get_PropertyCount minus 1) and return a string indicating a format of the value of the property. The format string may be loaded from a resource file.

The GetPropertyValues function may receive an index of a property (e.g., a number between 0 and the value of get_PropertyCount minus 1) and return an array of insertion values that can be inserted into a GetPropertyValueFormat insertion string.

The get_XMLElementString function may take no inputs and return a string containing the XML content for the particular namespace element.

The SetProfile function may receive as input a namespace element corresponding to an input profile and may add the input profile to the client computer on which the SetProfile function is called. The SetProfile function may further receive a Boolean value indicating whether the input profile is an update of a previously provisioned profile. If yes, the existing profile may be modified according to the input profile. Additionally, the SetProfile function may receive a context of the input profile, comprising further information such as user token, validation phase, and/or profile source.

Similarly, the RemoveProfile function may receive a namespace element corresponding to an input profile and may remove the input profile from the client computer on which the RemoveProfile function is called. The RemoveProfile function may also receive a context of the input profile.

The Prepare and Complete functions may be called to indicate, respectively, a beginning and an end of a profile operation. Each of these functions may receive as input a context in which the profile operation is performed.

The GetProfile function may receive a namespace element corresponding to an existing profile on the client computer on which the SetProfile function is called, and may export the existing profile to an output stream. Additionally, the SetProfile function may receive a context of the profile to be exported.

The Phase function may be called with no inputs and may return a phase of a profile operation. For example, there may be three different phases: validate, transacted, and apply. An output of the Phase function may indicated which of these three phases is being performed.

The UserToken function may be called with no inputs and may return a token for a user or computer associated with a current context.

The GetProfileType function may receive as input a namespace element corresponding to a profile and may return a profile type for that profile. For example, the profile type may indicate if the profile is a per-user profile or a machine-wide profile.

The ProfileSource function may be called with no inputs and may return an indication of a source of a profile in a current context. For example, the source may be a file, or a server side component of a network and connection provisioning framework.

The Root function may be called with no inputs and may return a namespace element corresponding to a root namespace for a current profile.

The ProvisioningFileName function may be called with any or no inputs and may return a string indicating a name of a file that is used for provisioning (e.g., import or export).

The Result function may be called with no inputs and may return an indication of a result of a current profile operation. For example, the result may be: succeeded, aborted, cancelled, failed, partial failure, or warning.

The TransactionHandle function may be called with no inputs and may return a transaction handle for use when provisioning a profile.

The ExecutionContext function may be called with no inputs and may identify the type of a context in which a current operation is performed. For example, the operation may be performed on the client side, on the server side, or on a standalone tool.

The OperationType function may be called with no inputs and may identify the type of a current operation. For example, the current operation may be an import operation or an export operation.

The ImportProfile function may receive as input a string indicating a name of a file from which one or more profiles are to be imported and may return a context containing a result of the import operation. Additionally, the ImportProfile function may receive an input parameter indicating a source of the one or more profiles. For example, the source may be a file distributed over the worldwide web, or the source may be a server side component of a network and connection provisioning framework. The ImportProfile function may also receive an input parameter identifying the type of a context in which the import operation is performed. For example, the import operation may be performed in a client side context or a server side context.

The ExportProfile function may receive as input a list of profiles to be exported and a string indicating a name of a file to which the profiles are to be exported. The ExportProfile function may also return a context containing a result of the export operation. Additionally, the ExportProfile function may receive an input parameter identifying the type of context in which the export operation is performed. For example, the export operation may be performed on the client side or the server side.

The Accept function may be called to proceed to a next phase, for example, after a user has accepted warnings associated with a current phase. The Accept function may receive as input a result of the current profile operation.

The SetExternalTransaction function may receive as input a transaction created by an external component and may set the transaction to NULL to revert to an internally created transaction.

Again, it should be appreciated that the functions described above are just illustrative and the aspects of the invention directed to API functions for stand-alone media managers and/or plug-in modules are not limited to these or any other particular functions.

Figure 13:
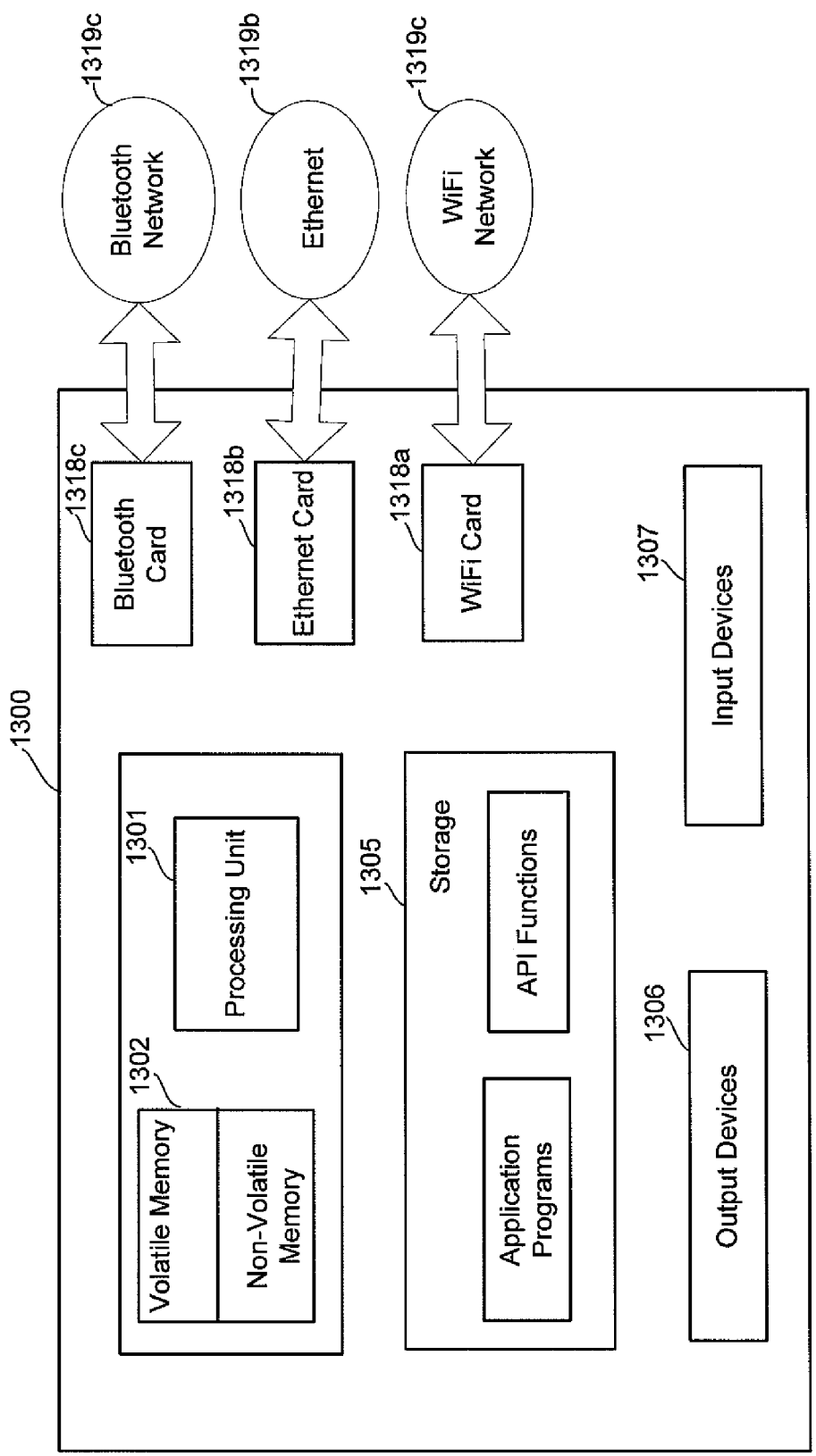
FIG. 13 is a schematic illustration of an exemplary computer, on which aspects of the invention may be implemented.

The aspects of the present invention described herein can be used with any computer or device having a processor that may be programmed to take any of the actions described above for presenting an interface to an administrator to create one or more configuration files and for provisioning any type of client devices based on one or more configuration files. FIG. 13 is a schematic illustration of an exemplary computer 1300 on which aspects of the present invention may be implemented. The computer 1300 includes a processor or processing unit 1301 and a memory 1302 that can include both volatile and non-volatile memory. The computer 1300 also includes storage 1305 (e.g., one or more disk drives) in addition to the system memory 1302. The memory 1302 can store one or more instructions to program the processing unit 1301 to perform any of the functions described herein. As mentioned above, the reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The computer may have one or more input and output devices, such as devices 1306 and 1307 illustrated in FIG. 13. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Computer 1300 may also comprise network interface cards (e.g., 1318a-c) to enable communication via various networks (e.g., 1319a-c). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art.

Such alterations, modifications, and improvements are intended to be within the spirit and scope of the invention. Accordingly, the foregoing description and drawings are by way of example only.

The above-described embodiments of the invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a computer system comprising at least one computer, the at least one computer comprising a plurality of media managers each of which enables the at least one computer to communicate using a respective one of a plurality of networking technologies, the method comprising:

using at least one processor to provide at least one management interface that enables an administrator to configure at least one setting, the at least one setting comprising a multi-technology setting that relates to at least a first networking technology enabled by a first media manager and a second networking technology enabled by a second media manager, the multi-technology setting being used by the at least one computer to control how the at least one computer communicates using at least one of the plurality of networking technologies enabled by the plurality of media managers, wherein the multi-technology setting comprises a policy that specifies a limit on a total number of connections allowed at one time for the at least one computer via the plurality of networking technologies.

2. The method of claim 1, wherein the at least one setting further comprises a policy that specifies a preference among at least some of the plurality of networking technologies to form a connection when multiple of the at least some of the plurality of networking technologies are available.

3. The method of claim 1, wherein the at least one setting further comprises a contingent setting for the first networking technology that is to be enforced only when the second networking technology is in active use.

4. The method of claim 1, wherein the at least one setting further comprises a policy that specifies a limit on a total number of networks to which the at least one computer may connect at any time via the plurality of networking technologies.

5. The method of claim 1, wherein the at least one management interface further enables the administrator to establish a plurality of sets of one or more configuration settings, each of the plurality of sets of configuration settings corresponding to one of the plurality of media managers and being used to configure the corresponding media manager to enable the at least one computer to communicate using the networking technology enabled by the corresponding media manager.

6. The method of claim 5, further comprising:
in response to input received from the administrator via the at least one management interface, creating a plurality of configuration profiles each of which corresponds to one of the plurality of media managers; and
providing, at least, the plurality of configuration profiles and the multi-technology setting to the at least one computer in a same configuration file.

7. The method of claim 6, further comprising:
receiving the configuration file at the at least one computer;
accessing, at least, each of the plurality of configuration profiles and the multi-technology setting from the configuration file; and
using, at least, each one of the plurality of sets of configuration settings and the multi-technology setting to configure the plurality of media managers.

8. The method of claim 6, wherein the configuration file comprises a hierarchical structure that comprises a root node and three nodes below it, the three nodes below the root node comprising a first node that is a policy node that relates to configuration information that is not specific to any particular network or media type, a second node that is a network layer node that relates to configuration information for layer 3 in the Open Systems Interconnection (OSI) model of networking, and a third node that is a connections node that relates to configuration information for layer 2 in the OSI model of networking.

9. A computer comprising:
a plurality of media managers each of which enables the computer to communicate using a corresponding one of a plurality of networking technologies;
and at least one processor programmed to:
retrieve from a configuration file at least one setting, the at least one setting comprising a multi-technology setting that relates to at least a first networking technology enabled by a first media manager and a second networking technology enabled by a second media manager, wherein the multi-technology setting comprises a policy that specifies a limit on a total number of connections allowed at one time for the at least one computer via the plurality of networking technologies; and
use, at least, the multi-technology setting that relates to at least the first and second networking technologies to control how the computer communicates using at least one of the plurality of networking technologies enabled by the plurality of media managers.

10. The computer of claim 9, wherein the at least one setting further comprises a policy that specifies a preference among at least some of the plurality of networking technologies to form a connection when multiple of the at least some of the plurality of networking technologies are available.

11. The computer of claim 9, wherein the at least one setting further comprises a contingent setting for the first networking technology that is to be enforced only when the second networking technology is in active use.

12. The computer of claim 9, wherein the at least one setting further comprises a policy that specifies a limit of a total number of networks to which the at least once computer may connect at any time via the plurality of networking technologies.

13. The computer of claim 9, wherein the at least one processor is further programmed to:
retrieve from the configuration file a plurality of configuration profiles each of which comprises a set of one or more configuration settings for a corresponding one of the plurality of networking technologies; and
use the plurality of configuration settings to configure the plurality of media managers to enable the computer to communicate using the plurality of networking technologies.

14. The computer of claim 9, wherein the configuration file comprises a hierarchical structure that comprises a root node and three nodes below it, the three nodes below the root node comprising a first node that is a policy node that relates to configuration information that is not specific to any particular network or media type, a second node that is a network layer node that relates to configuration information for layer 3 in the Open Systems Interconnection (OSI) model of networking, and a third node that is a connections node that relates to configuration information for layer 2 in the OSI model of networking.

15. At least one tangible computer readable storage device encoded with a plurality of instructions that, when executed, perform a method for use in a computer system comprising at least one computer, the at least one computer comprising a plurality of media managers each of which enables the at least one computer to communicate using a respective one of a plurality of networking technologies, the method comprising:
providing at least one management interface that enables an administrator to configure at least one setting, the at least one setting comprising a multi-technology setting that relates to at least a first networking technology enabled by a first media manager and a second networking technology enabled by a second media manager, the multi-technology setting being used by the at least one computer to control how the at least one computer communicates using at least one of the plurality of networking technologies enabled by the plurality of media managers, wherein the multi-technology setting comprises a policy that specifies a limit on a total number of networks to which the at least one computer may connect at any time via the plurality of networking technologies.

16. The at least one tangible computer readable storage device of claim 15, wherein the at least one setting further comprises a policy that specifies a preference among at least some of the plurality of networking technologies to form a connection when multiple of the at least some of the plurality of networking technologies are available.

17. The at least one tangible computer readable storage device of claim 15, wherein the at least one setting further comprises a policy that specifies a limit on a total number of connections allowed at one time for the at least one computer via the plurality of networking technologies.

18. The at least one tangible computer readable storage device of claim 15, wherein the method further comprises:
in response to input received from the administrator via the at least one management interface, creating a plurality of configuration profiles each of which corresponds to one of the plurality of media managers; and
providing, at least, the plurality of configuration profiles and the multi-technology setting to the at least one computer in a same configuration file.

19. The at least one tangible computer readable storage device of claim 18, wherein the configuration file comprises a hierarchical structure that comprises a root node and three nodes below it, the three nodes below the root node comprising a first node that is a policy node that relates to configuration information that is not specific to any particular network or media type, a second node that is a network layer node that relates to configuration information for layer 3 in the Open Systems Interconnection (OSI) model of networking, and a third node that is a connections node that relates to configuration information for layer 2 in the OSI model of networking.

* * * * *